(12) United States Patent
Liu (10) Patent No.: US 9,157,402 B2
(45) Date of Patent: Oct. 13, 2015

(54) MULTI-VALVE FUEL INJECTION SYSTEM AND INJECTION METHOD (76) Inventor: Fushui Liu, Beijing (CN)

( * ) Notice: Subject to any disclaimer, the term of this patent is extended or adjusted under 35 U.S.C. 154(b) by 33 days.

(21) Appl. No.: 14/355,915

(22) PCT Filed: Nov. 17, 2011

(86) PCT No.: PCT/CN2011/082347
§ 371 (c)(1),
(2), (4) Date: May 2, 2014

(87) PCT Pub. No.: WO2013/063828
PCT Pub. Date: May 10, 2013

(65) Prior Publication Data
US 2014/0299194 A1 Oct. 9, 2014

(30) Foreign Application Priority Data

Nov. 3, 2011 (CN) .......................... 2011 1 0344234

(51) Int. Cl.
F02D 31/00 (2006.01)
F02M 59/36 (2006.01)
F02M 59/02 (2006.01)
F02M 59/10 (2006.01)
F02M 63/02 (2006.01)
F02D 41/40 (2006.01)
F02D 41/38 (2006.01)
F02M 47/02 (2006.01)

(52) U.S. Cl.
CPC ......... *F02M 59/366* (2013.01); *F02D 41/3845* (2013.01); *F02D 41/401* (2013.01); *F02D 41/402* (2013.01); *F02D 41/406* (2013.01); *F02M 59/025* (2013.01); *F02M 59/102* (2013.01); *F02M 63/02* (2013.01); *F02M 47/027* (2013.01); *Y02T 10/44* (2013.01); *Y10T 137/0318* (2015.04); *Y10T 137/86027* (2015.04)

(58) Field of Classification Search
CPC combination set(s) only.
See application file for complete search history.

(56) References Cited

U.S. PATENT DOCUMENTS 6,318,343 B1 * 11/2001 Nakagawa et al. ........... 123/500
2002/0170539 A1 * 11/2002 Rembold et al. ............. 123/458
2003/0154959 A1 * 8/2003 Rembold et al. ............. 123/458

FOREIGN PATENT DOCUMENTS

| CN | 101806266 A | 8/2010 |
| CN | 201778934 U | 3/2011 |
| EP | 1336752 A2 | 8/2003 |
| WO | WO0246590 A1 | 6/2002 |

OTHER PUBLICATIONS

International Search Report for International Application No. PCT/CN2011/082347, mailed on Aug. 9, 2012.

* cited by examiner

*Primary Examiner* — Hung Q Nguyen
(74) *Attorney, Agent, or Firm* — Scientific Works, LLC; Yue Ma (57) ABSTRACT A multi-valve fuel injection system comprising an electronic unit pump for outputting high pressure fuel; a low pressure fuel pipe for inputting fuel into the plunger cavity of the electronic unit pump; a fuel supply cam for propelling the movement of the plunger of the electronic unit pump to produce high pressure fuel; at least two electronically controlled fuel injectors for injecting fuel; high pressure fuel injection pipe connecting the electronic unit pump and the electronically controlled fuel injectors for transporting the high pressure fuel outputted form the electronic unit pump to the electronically controlled fuel injectors, respectively, for controlling the electronic unit pump and the opening and closing of solenoid valves in the fuel injectors. The fuel injection system can achieve large range fuel injection and high circulating response. Also disclosed is a fuel injection method for the multi-valve fuel injection system.

15 Claims, 5 Drawing Sheets

MULTI-VALVE FUEL INJECTION SYSTEM AND INJECTION METHOD

CROSS-REFERENCE TO RELATED APPLICATION

This application is a U.S. National Phase Application of PCT International Application No. PCT/CN2011/082347 filed on Nov. 17, 2011, which claims priority to Chinese Patent Application No. 201110344234.4, filed on Nov. 3, 2011, the contents of each of which are incorporated herein by reference in their entirety for all purposes.

FIELD OF THE INVENTION

The present invention relates to fuel injection system. In detail, it is to an electronically controlled high pressure fuel supply system and a method characterized by ideal fuel supply performance with full range of operating condition.

BACKGROUND OF THE INVENTION

With the development of the liquid fuel engine technology, high power density is greatly needed. The higher efficiency of cylinder combustion process can enhance the engine power, wherein the most important factor is to optimize the fuel injection process.

Taking diesel engine as an example, with the enhancement of the power, the power scope becomes wider, which needs to enlarge the range of fuel injection quantity. Large fuel injection means to require large fuel injector nozzle area. Under the condition of small fuel injection quantity or idling, the large fuel injector nozzle can cause relatively large fuel injection error which may lead to speed fluctuation. However, if we accurately control the fuel injection quantity at the low speed, we will not get the maximum fuel injection. The highly-intensified diesel engine should embrace the real-time flexible adjustable characteristics at the process of high pressure injection so as to improve the dynamic characteristics of the engine. As for the mainstream oil supply system it is a challenge to accurately control the large scope of fuel injection quantity and improve the cycle responding characteristics of the fuel injection system.

The high pressure common rail fuel supply system can flexibly regulate the fuel injection. But the larger volume of the common rail cavity leads to slower cycle response speed that is unable to regulate injection starting pressure in cycles. The electronic unit pump adopts the mode of one cylinder to one pump which accumulates the high pressure only at the injection stage. It can obtain the high injection pressure and enjoy system reliability. But the disadvantages are also obvious: the injection pressure and fuel injection law can not be adjusted, the injection pressure relates with cam speed which cannot match the injection characteristic for high speed and low speed simultaneously. It can be concluded that neither high pressure common rail fuel supply system nor electronic unit pump can meet the large fuel injection scope of the highly-intensified diesel engine and high requirements for the cycle response characteristic.

Thus, we need a new type of fuel injection technology to optimize the fuel injection process to solve the above problems.

SUMMARY OF THE INVENTION

The present invention integrates the advantages of both electronic unit pump and high-pressure common rail system. It adopts the structure with one electronic unit pump to multi electronic fuel injectors and provides a new valve fuel system. Based on the fuel supply cam profile of the electronic unit pump and the speed, injection pressure and injection law can be flexibly regulated through adjusting the controlled time sequence of the electronic unit pump and electronic fuel injectors.

The present invention provides a type of multi-valve fuel injection system which includes the following components.

Electronic unit pump, which is used to output high pressure fuel.

Low pressure fuel pipe, which is used to input fuel to the pump chamber of electronic unit pump as mentioned.

Fuel supply cam, which is used to push the plunger of the electronic unit pump mentioned above to generate the high pressure fuel.

At least two electronic fuel injectors for fuel injection.

High pressure fuel injection pipe. Which is used to connect the electronic unit pump and electronic fuel injectors as mentioned and make the high pressure fuel outputted by the electronic unit pump flow into the electronic fuel injectors.

Electronic control unit, which is used to connect the electronic unit pump and electronic fuel injectors as mentioned above respectively. It can control the opening and closing of the solenoid valve in the electronic unit pump and electronic fuel injectors as mentioned.

The present invention also provides a new injection method of multi-valve injection system including the following components.

Electronic unit pump, which is used to output the high pressure fuel.

Low pressure fuel pipe, which is used to input fuel to the pump chamber of electronic unit pump as mentioned Fuel supply cam, which is used to push the plunger motion of the electronic unit pump as mentioned to generate the high pressure fuel.

Two electronic fuel injectors at least, which are used for fuel injection.

High pressure injection pipe, which is used to connect the electronic unit pump and the electronic fuel injectors as mentioned and make the high pressure fuel outputted by the electronic unit pump flow into the electronic fuel injectors.

Electronic control unit, which is used to connect the electronic unit pump and electronic fuel injectors as mentioned respectively. It can control the opening and closing of the solenoid valve in the electronic unit pump and electronic fuel injectors as mentioned.

The present injection method includes the following procedures.

Input fuel to the pump chamber of the electronic unit pump by the low pressure fuel pipe.

When the fuel supply cam pushes the plunger of the electronic unit pump to move towards the plunger chamber and the control valve of the electronic unit pump is closed, cut off the connection between the low pressure fuel pipe and the plunger chamber, and the plunger is pushed by the fuel supply cam which extrudes the fuel to get high pressure. In addition, the high pressure fuel flows into the electronic fuel injector through the high pressure injection pipe.

According to the combustion demand, at least one solenoid valve of the electronic fuel injector should be time opening to finish one injection process.

The present invention has the following advantages: first, the common rail cavity was replaced by the high pressure fuel injection pipe which not only makes the electronic unit pump and electronic fuel injector keep pressure with synchronization but also improves the responding features of the system.

Second, in the high pressure fuel injection pipe, there is only instantaneous high pressure, not continuous high pressure, so the reliability of the system can be improved. Third, the quick adjustment of the characteristics of fuel supply in each working cycle can be achieved, which meets the dynamic acceleration characteristics of vehicles. Fourth, the solenoid valves which are used for generating high pressure and injecting fuel are controlled by the electronic control units respectively. According to fuel injection demand, operation timing of solenoid valves and injection pressure are adjusted to generate high pressure at low speed, greatly improve the starting characteristic of liquid fuel engine and reduce emission during starting process. Fifth, under the condition of high load and speed, it can achieve large fuel injection quantity in a short time, so optimizing the combustion process. Sixth, single electronic unit pump supplies fuel to multi-cylinders, which leads to substantial decrease of the system cost.

BRIEF DESCRIPTION OF THE DRAWINGS

For a more complete understanding of the present disclosure and its advantages, reference is now made to the following description, taken in conjunction with the accompanying drawings, in which.

The identical and similar references represent the identical and similar components in attached drawings

DETAILED DESCRIPTION

The following drawings describe the invention in details.

The drawings display embodiment of the invention, in which the identical and similar signs represent the identical and similar components or components possess the identical and similar functions. The following description of the preferred embodiments is merely exemplary in nature and is in no way intended to limit the invention, its application, or uses.

The following section provides many different embodiments and examples which describe the different structures of the present invention. In order to simplify the publicity of the invention, the following section describes components and settings of a specific example. In fact, they are only exemplary and their aims are not to limit the invention. Besides, the present disclosure can repeat the reference FIGs and/or letters in different examples. These repetitions are for aims of simplifying and clearing, and they don't express the relationship between embodiments discussed and/or their settings. Moreover the invention supplies many examples of specific technology and material, but in this field, common technical workers are aware of the application of other technology and/or the usage of other material. In addition, the structures of the first character above the second character can include not only the direct contact embodiment made by the first and second character but also the embodiment made by other characters between the first character and the second one, so that the first character may not have direct contact with the second character. In the drawing the components are not necessarily to scale and this should be specially noticed. The present invention omits the description of the known components and processing technologies to avoid limiting this invention.

Figure 1:
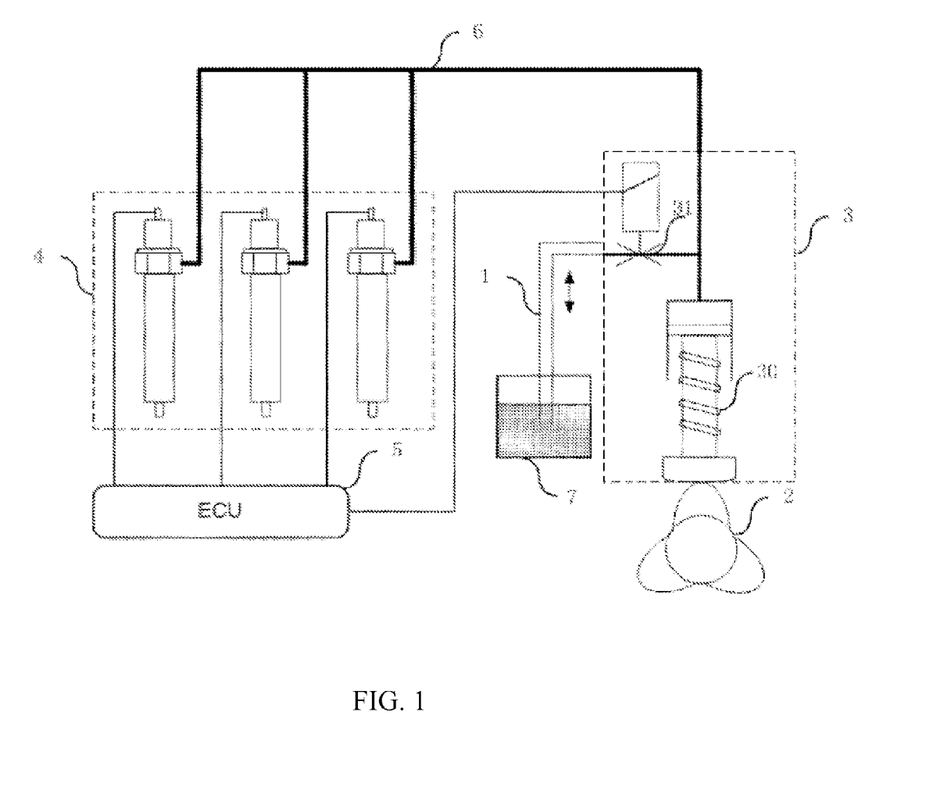
FIG. 1 is a profile of a preferred embodiment structure of the multi-valve fuel injection system of this invention.

The structure of multi-valve fuel injection system of the present invention (referring to FIG. 1) is depicted as follows. In FIG. 1 the multi-valve fuel injection system includes low pressure fuel circuit 1, fuel supply cam 2, electronic unit pump 3, electronic fuel injector 4, electronic control unit 5 and high pressure injection pipe 6, wherein the electronic unit pump 3 consists of plunger 30 and solenoid valve 31 controlling the low pressure fuel circuit. Moreover each electronic fuel injector 4 has the solenoid valve which can control fuel injection condition.

One end of the low pressure fuel circuit 1 connects the tank 7 and the other end reaches electronic unit pump 3. In most of the cases, the low pressure fuel pipe 1 is in fluid communication with electronic unit pump 3 and it can make the low pressure fuel flow into the electronic unit pump 3 from tank 7. When the solenoid valve 31 between the low pressure fuel pipe 1 and electronic unit pump 3 is closed, the fluid communication is cut off.

When the fuel supply cam 2 rotates to a certain angle, the bulge of the fuel supply cam 2 has contact with plunger 30 of the electronic unit pump 3, drive plunger 30 move upward and extrude the fuel in the plunger chamber. With ceaseless rotation of the fuel supply cam 2, the cam drives plunger 30 to make reciprocating linear motion and then make the electronic unit pump work. When plunger moves down, the plunger chamber is full of fuel. When the plunger moves up, it squeezes the fuel. When plunger 30 moves up and the solenoid valve 31 is open, with the connectivity of tank, low pressure fuel circuit, plunger chamber and high pressure fuel pipe, the squeezing cannot generate high pressure in the plunger chamber and high pressure pipe. When plunger 30 moves up and the solenoid valve 31 is closed, with the disconnection of high and low pressure fuel pipe, the plunger compresses the enclosed spaces to generate high pressure in the high pressure fuel injection pipe. The opening and closing of the solenoid valve 31 of the electronic unit pump 3 is controlled by the electronic control unit 5.

The high pressure fuel flows into the electronic fuel injector 4 through high pressure pipe 6. As shown in the FIG, electronic control unit 5 can control the operation timing of the electronic fuel injector 4. According to the engine firing sequence and fuel injection timing, electronic control unit 5 chooses electronic fuel injector for fuel injection and the opening commands are sent to the electronic fuel injector 4, then it opens the internal solenoid valve to start the electronic fuel injector 4. At the same time, it can start all the electronic fuel injectors 4, any one or more of them. But in order to ensure the injection pressure of each electronic fuel injectors 4 and the stability of the whole system, it is preferred to allow only one of the electronic fuel injectors to start fuel injection operation at any time.

After opening the solenoid valve of the electronic fuel injector 4, the fuel pipe keeps high pressure state and the electronic fuel injector begins to work. When closing the solenoid valve of the electronic fuel injector 4, the fuel injection stops. So the above description is the whole fuel injection process. During a working cycle in some cylinder of the engine, by controlling the opening and closing operation timing of the solenoid valves in the electronic unit pump and the corresponding electronic fuel injector, the injection timing of the electronic fuel injector and fuel injection duration can be controlled.

After the injection finished, electronic control unit 5 makes the solenoid valve of the electronic fuel injector 4 closed, and the solenoid valve 31 of the electronic unit pump 3 opens, so that the high pressure fuel injection pipe 6, electronic unit pump 3 and low pressure fuel pipe 1 are connected and the high pressure fuel in the high pressure injection pipe 6 flows back to the low pressure fuel pipe 1. When the high pressure injection pipe is in high pressure, by open the solenoid valve 31 of the electronic unit pump 3, the pressure in the high pressure injection pipe can be reduced.

The number of convex of cam profile of the fuel supply cam is the same as that of the electronic control injectors. As shown in FIG. 1, there are three electronic control injectors, and correspondingly, the cam profile of the fuel supply cam 2 has three convexes. The convex of the cam profile has contact with the plunger of the electronic unit pump 3 to drive the plunger to compress the fuel in the plunger chamber. If the solenoid valve 31 of the electronic unit pump 3 is closed, high pressure is established in the high pressure injection pipe. People can enhance the speed ratio of the cam and crankshaft to make one cam match multi-injectors. In fact, as for four-stroke diesel engine, the ratio of the number of the described electronic control injector and the number of cam profile convex of the fuel supply cam is twice as the speed ratio of camshaft and crankshaft, as for two-stroke diesel engine, the ratio of the number of electronic control injector and the number of cam profile convex of the fuel supply cam is the same as the speed ratio of camshaft and crankshaft. For example, as for four-stroke diesel engine, when the speed ratio of cam and crankshaft is 1 to 1, one convex can match two injectors, when the speed ratio of cam and crankshaft is 2 to 1, one convex can match four injectors.

Figure 2:
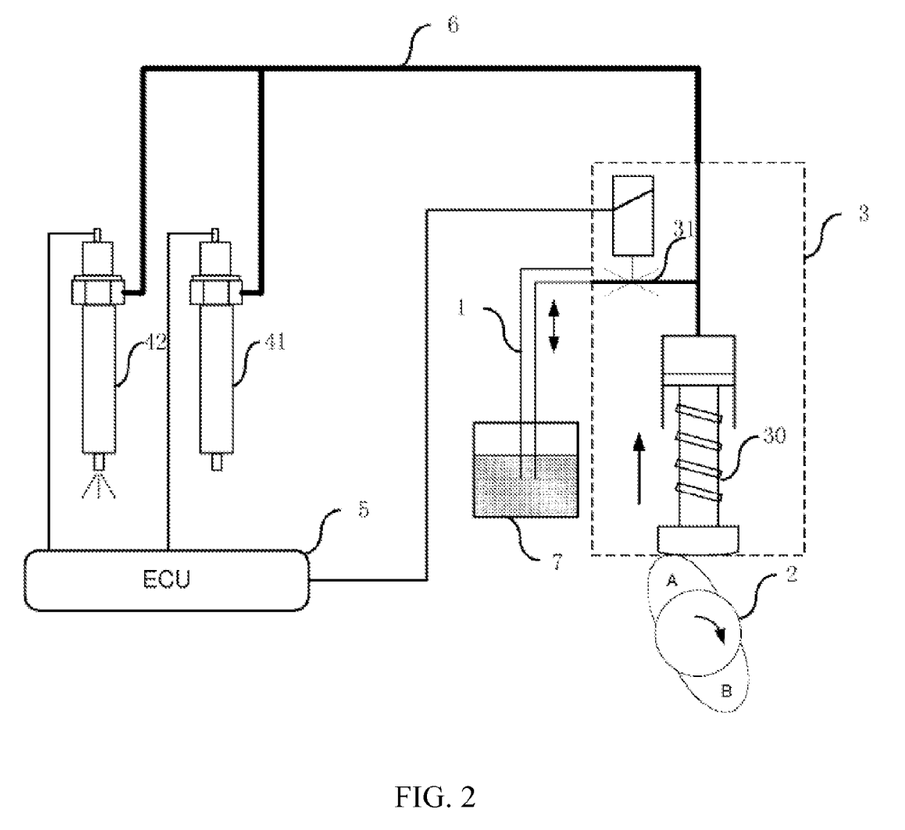
FIG. 2 is a profile of another preferred embodiment structure of the multi-valve fuel injection system of this invention.
Figure 3:
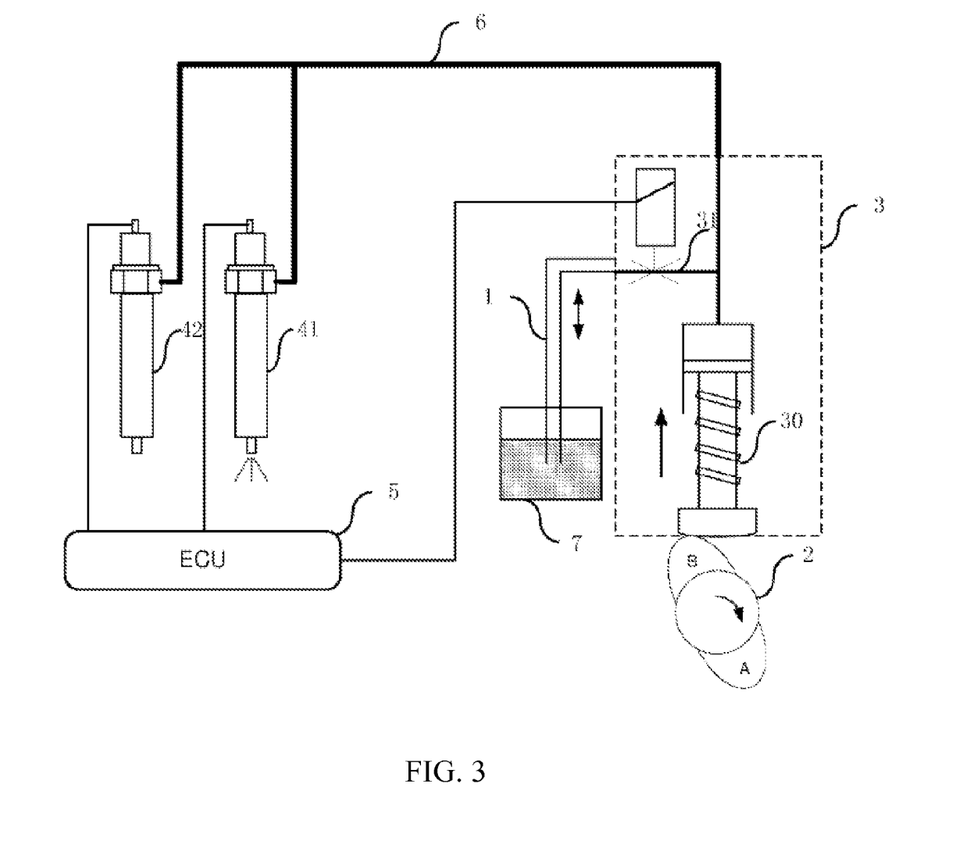
FIG. 3 is a profile of another preferred embodiment structure of the multi-valve fuel injection system of this invention.
Figure 4:
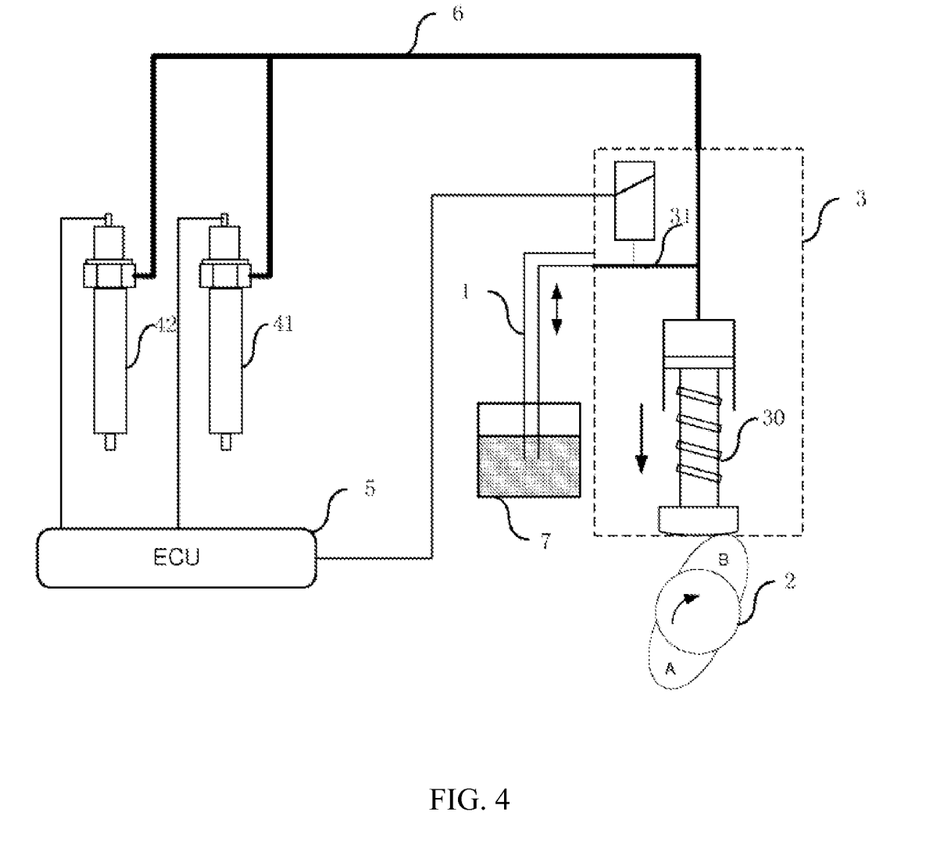
FIG. 4 is a profile of another preferred embodiment structure of the multi-valve fuel injection system of this invention.

FIG. 2 to FIG. 4 are schematic diagrams of the specific working process of the multi-valve fuel injection system. The difference between the multi-valve fuel injection system referring to FIG. 2 to FIG. 4 and the one referring to FIG. 1 includes: there are two electronic control injectors: injector 41 and injector 42. Correspondingly, the cam profile of the fuel supply cam 2 has two convexes: convex A and convex B.

As shown in FIG. 2, electronic control unit 5 closes the solenoid valve 31 of the electronic unit pump 3 and cut off the connection between the low pressure fuel pipe 1 and the plunger chamber of the electronic unit pump 3. Convex A of the cam profile of the fuel supply cam 2 has contact with the plunger 30 of the electronic unit pump 3 to make the plunger 30 move upward and then compresses the fuel in the plunger chamber to generate high pressure fuel. Through high pressure fuel injection pipe 6, the fuel is sent to electronic control injector 41 and 42. The electronic control unit 5 opens the solenoid valve of the electronic control injector 42, then the injector 42 begins to work, and one fuel injection is completed.

With the rotating of the fuel supply cam 2, when the convex B of the cam profile of the fuel supply cam 2 has contact with the plunger 30 of the electronic unit pump 3, the plunger 30 is driven to move upward and then compress the fuel in the plunger chamber to generate high pressure fuel. Through high pressure fuel injection pipe 6, the fuel is sent to electronic control injector 41 and 42. The electronic control unit 5 opens the solenoid valve of the electronic control injector 41, then injector 41 begins to work, and one fuel injection is completed (referring to FIG. 3).

When the plunger moving upward in the plunger chamber, multi-closing and multi-opening the solenoid valve of electronic control injector can realize multi-injection for one electronic control injector in a single working course. During the process of different convex driving the plunger moving into the plunger chamber, by multi-closing and multi-opening the solenoid valve 31 of electronic unit pump 3 and meanwhile opening and closing the solenoid valve of at least one electronic control injector in turn, the in-turn fuel injection of multi-injector can be realized in a single working course. Besides, by changing the controlling sequence between the solenoid valve 31 of electronic unit pump 3 and the solenoid valve of the electronic control injector, the working sequence, injection pressure and injection law (e.g. injection timing and injection duration) of each electronic control injector can be flexibly controlled.

When the plunger 30 goes down and the solenoid valve of the electronic unit pump 3 is open, the low pressure fuel pipe 1 has connection with the plunger chamber of electronic unit pump 3 and begins to feed the fuel in the plunger chamber (referring to FIG. 4).

FIG. 1 to 4 show that there can be several fuel supply cams and electronic control injectors. It is worth attention that the number of electronic control injector 4 and the number of convex of cam profile of the oil supply cam 2 can be both the same and different.

Figure 5:
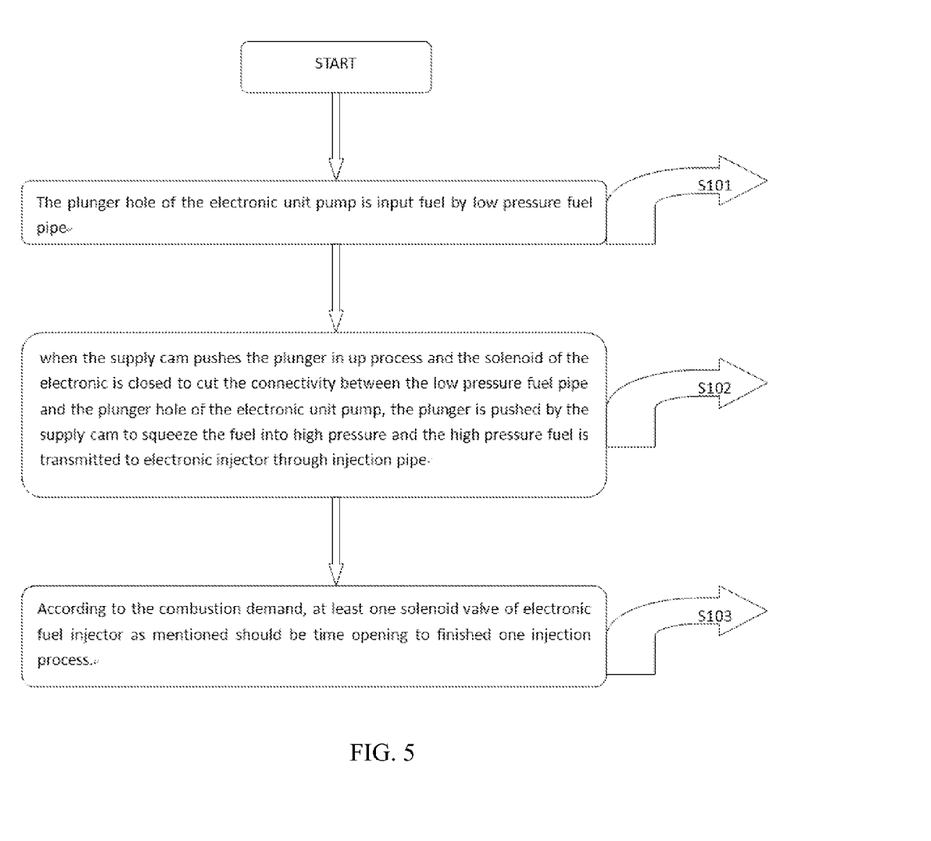
FIG. 5 is a flowchart of a preferred embodiment of the multi-valve fuel injection method of this invention.

FIG. 5 is a flow chart of a preferred application mode of the present invention. First, in the step S101, fuel is inputted to the plunger hole of the electronic unit pump through low pressure fuel pipe. Meanwhile, the solenoid of the electronic unit pump is open, controlled by the electronic control unit, wherein the low pressure fuel pipe, plunger hole of the electronic unit pump and the fuel injection pipe are connected. Then, in the step S102, when the supply cam pushes the plunger upward and the solenoid of the electronic is closed, cut off the connection between the low pressure fuel pipe and the plunger hole of the electronic unit pump, wherein the plunger is pushed by the supply cam to squeeze the fuel into high pressure and the high pressure fuel is transmitted to electronic injector through injection pipe. In the previous step, the plunger hole is inputted with fuel and the solenoid valve between the low pressure fuel pipe and the electronic unit pump is closed, so as to form a confined space with high pressure pipe. For the squeezing by the plunger, the volume of the confined space reduced to establish high pressure for the fuel. In the step S103, according to the combustion demand, timed open at least one of the solenoid valve of the electronic control injector, completing one course of injection. The high pressure fuel is sent to the electronic control injector by high pressure oil tube. When fuel emission is needed, the electronic control unit opens at least one solenoid valve of the electronic control injector to complete the injection process. One cylinder matches one electronic control injector. In a working cycle of the cylinder, by controlling the opening and closing sequence of the solenoid valves of the electronic control injector and the electronic unit pump, the aim of multi-emitting in one circulation of the electronic control injector can be realized. In addition, whether the electronic control injector emits fuel or not in every cylinder is controlled by electronic control unit, by controlling the opening and closing sequence of the solenoid valve of electronic unit pump and the electronic control injector, independent control of the injection pressure, injection time and injection duration of every electronic control injector can be achieved.

To avoid over-high pressure in injection pipe, the solenoid valve of the electronic unit pump could be over-voltage protected. When the oil pressure of the fuel injection pipe exceeds the predefined-threshold, the solenoid valve of the claimed electronic unit pump opens and makes the fuel of the fuel injection pipe reflux into oil tank to reduce the pressure of the injection pipe.

The present invention is described by referring to diesel engine, illustrating the new multi-valve fuel injection method and the specific implementation details. In fact, the present invention can also applied to other liquid fuel engine, including but not limiting the gasoline engine, oil engine, two DME engine, etc.

To sum up, by adopting the mode of multi-nozzle and single-pump, the new multi-valve fuel injection system can meet the need of large scale fuel injection adjusting and quick regulating of the supply fuel performance in cycles. To further improve the liquid fuel engine performance, it is of great significance to present the new multi-valve fuel injection system for practical application.

Even though the invention has been described on the basis of specific embodiments, numerous variations and alternative embodiments can be deduced by the person skilled in the art, e.g. by combination and/or exchange of features of individual embodiments. Accordingly, it goes without saying for the person skilled in the art that such variations and alternative embodiments are also encompassed by the present invention, and the scope of the invention is only restricted within the meaning of the accompanying patent claims and the equivalents thereof.

What is claimed is:

1. A multi-valve injection fuel system, comprising:
    an electronic unit pump disposed in the multi-valve injection fuel system, the electronic unit pump operable to output high pressure fuel;
    a low-pressure fuel pipe disposed in the multi-valve injection fuel system, the low-pressure fuel pipe operable to input fuel into plunger hole of the electronic unit pump;
    a supply cam disposed in the multi-valve injection fuel system, the supply cam operable to generate high pressure fuel by pushing the plunger of the electronic unit pump; at least two electronic injectors disposed in the multi-valve injection fuel system, the electronic injectors operable to inject fuel;
    one or more high pressure fuel injection pipes operable to connect the electronic unit pump and the electronic injectors to transport the high pressure fuel outputted by the electronic unit pump to the claimed electronic injectors;
    an electronic control unit operable to connect the electronic unit pump and the electronic injectors respectively to control the opening and closing of a solenoid valve of the electronic unit pump and the electronic injector.

2. The system according to claim 1, wherein the low-pressure fuel pipe connects the electronic unit pump when the solenoid valve of the electronic unit pump is open, which is controlled by the electronic control unit; and wherein the low pressure fuel pipe transport fuel into the plunger hole of the electronic unit pump when the plunger of the electronic unit pump moves out from the plunger hole.

3. The system according to claim 1, wherein the supply cam is placed out of the plunger of the electronic unit pump, when the supply cam pushes the plunger of the electronic unit pump into the plunger hole and the electronic control unit cuts off the connection between the low pressure fuel pipe and the plunger hole of the electronic unit pump, the fuel in the plunger hole and the high pressure fuel injection pipe is squeezed to be in high pressure.

4. The system according to claim 1, wherein the electronic injector begins to inject fuel when the solenoid valve of the electronic unit pump is open, which is controlled by the electronic control unit, and meanwhile the fuel in the fuel injection pipe is in high pressure.

5. The system according to claim 1, wherein the ratio of the number of electronic injectors to the number of bulges is a multiple of the ratio of the cam speed to the shaft speed.

6. The system according to claim 1, wherein the electronic control unit controls the time sequence of being open or closed of the solenoid valve of the electronic unit pump and of the electronic injector to regulate the working sequence of the electronic injectors, and the injection pressure, the injection timing and the injection duration.

7. The system according to claim 1, wherein the solenoid valve of the electronic unit pump opens to make the fuel in the high pressure fuel injection pipe reflux into the low pressure fuel pipe when the oil pressure in the high pressure fuel injection pipe exceeds the predefined-threshold.

8. A fuel injecting method for a multi-valve fuel injection system, wherein the multi-valve fuel injection system comprising:
    an electronic unit pump disposed in the multi-valve injection fuel system, the electronic unit pump operable to output high pressure fuel;
    a low-pressure fuel pipe disposed in the multi-valve injection fuel system, the low-pressure fuel pipe operable to input fuel into plunger hole of the electronic unit pump;
    a supply cam disposed in the multi-valve injection fuel system, the supply cam operable to generate high pressure fuel by pushing the plunger of the electronic unit pump;
    at least two electronic injectors disposed in the multi-valve injection fuel system, the electronic injectors operable to inject fuel;
    one or more high pressure fuel injection pipes operable to connect the electronic unit pump and the electronic injectors to transport the high pressure fuel outputted by the electronic unit pump to the electronic injectors;
    an electronic control unit operable to connect the electronic unit pump and the electronic injectors respectively to control the opening and closing of a solenoid valve of the electronic unit pump and the electronic injector;
    the fuel injecting method comprising the steps of:
    inputting fuel into the plunger hole of the electronic unit pump through the low pressure fuel pipe;
    when the supply cam pushes the plunger of the claimed electronic unit pump into the plunger hole and the control valve of the electronic unit pump is turned off, cut off the connection between the low pressure fuel pipe and the plunger hole of the electronic unit pump, wherein the plunger is pushed by the cam so that the fuel is squeezed to high pressure, which could be transferred to one or more of the electronic injectors through one or more of the high pressure pipes;
    according to combustion demand, turn on a solenoid valve of at least one of the electronic injectors in a timing way to complete one injection process.

9. The method according to claim 8, wherein the low-pressure fuel pipe builds up connection with the electronic unit pump when the solenoid valve of the electronic unit pump is open, which is controlled by the electronic control unit, and the low pressure fuel pipe transfers fuel into the plunger hole of the electronic unit pump when the plunger of the electronic unit pump moves out from the plunger hole.

10. The method according to the claim 8, wherein the solenoid valve of the electronic unit pump is opened by the electronic control unit to reduce the pressure in the high pressure fuel pipe when the inside of the high pressure fuel pipe is in high pressure.

11. The method according to claim 8, wherein the electronic injector begins to inject fuel when the solenoid valve of the electronic unit pump is open under the control of the electronic control unit and meanwhile, the fuel in the fuel injection pipe is in high pressure.

12. The method according to claim 8, wherein the electronic control unit controls the time sequence of being open or closed of the solenoid valve of the electronic unit pump and of the electronic injector to regulate the working sequence of the electronic injectors, and the injection pressure, an injection timing and an injection duration.

13. The method according to claim 8, wherein a time sequence of the solenoid valves of the electronic unit pump and the different electronic injectors is controlled to implement multiple fuel injections in one working cycle for a respective electronic injector when the supply cam pushes the plunger of the electronic unit pump into the plunger hole.

14. The method according to claim 8, wherein a time sequence of the solenoid valve of the electronic unit pump and the different electronic injectors is controlled to implement successive fuel injections in one working cycle for multiple electronic injectors.

15. The method according to claim 8, wherein the solenoid valve of the electronic unit pump opens to make the fuel in the high pressure fuel pipe reflux into the low pressure fuel pipe when the fuel pressure in the high pressure fuel pipe exceeds the predefined-threshold.

\* \* \* \* \*